United States Patent
Prochac (12)

(10) Patent No.: US 6,427,993 B1
(45) Date of Patent: Aug. 6, 2002

(54) PIPE FITTING APPARATUS AND METHOD

(76) Inventor: Jan Prochac, 7545 Orien Ave., La Mesa, CA (US) 91941

( * ) Notice: Subject to any disclaimer, the term of this patent is extended or adjusted under 35 U.S.C. 154(b) by 0 days.

(21) Appl. No.: 09/730,749

(22) Filed: Dec. 5, 2000

(51) Int. Cl.[7] .............................................. B25B 1/20
(52) U.S. Cl. .......................... 269/37; 269/45; 269/71; 269/901; 269/74; 29/281.1
(58) Field of Search ........................... 269/37, 41, 45, 269/71, 74, 104, 201, 901; 29/281.1

(56) References Cited

U.S. PATENT DOCUMENTS

| 69,418 A | * 10/1867 | Elmer ........................ 269/37 |
| 2,455,517 A | * 12/1948 | Nielson ..................... 269/131 |
| 3,827,126 A | * 8/1974 | Shiozawa et al. ............ 269/45 |
| 3,963,231 A | 6/1976 | Cooper |
| 4,893,393 A | 1/1990 | Marshall |
| 5,052,608 A | 10/1991 | McClure |
| 5,494,268 A | * 2/1996 | Heintz ........................ 269/69 |
| 5,568,265 A | 10/1996 | Matthews |
| 5,692,285 A | 12/1997 | Weimer et al. |
| 5,895,035 A | 4/1999 | Bley |
| 5,971,379 A | * 10/1999 | Leon, Jr. .................... 269/37 |

* cited by examiner

Primary Examiner—Joseph J. Hail, III
Assistant Examiner—Lee Wilson
(74) Attorney, Agent, or Firm—Brown, Martin, Haller & McClain, LLP

(57) ABSTRACT

A pipe fitting apparatus includes first and second connector units for releasable connection to respective first and second pipe sections adjacent pipe ends to be coupled, so as to hold the pipe sections relative to one another in the desired relative orientations during welding. Each connector unit has a groove on one face for location against the outside of a pipe, with the longitudinal groove axis extending parallel to the axis of a pipe to which it is secured. The units are adjustably secured together by a pivot coupling having a pivot axis extending transverse to the groove axis for pivotal adjustment of the orientation of the second connector unit relative to the first connector unit, whereby the relative orientation of the first and second pipes to be coupled can be adjusted. A releasable locking device releasably secures the second connector unit at a selected orientation relative to the first connector unit.

20 Claims, 3 Drawing Sheets

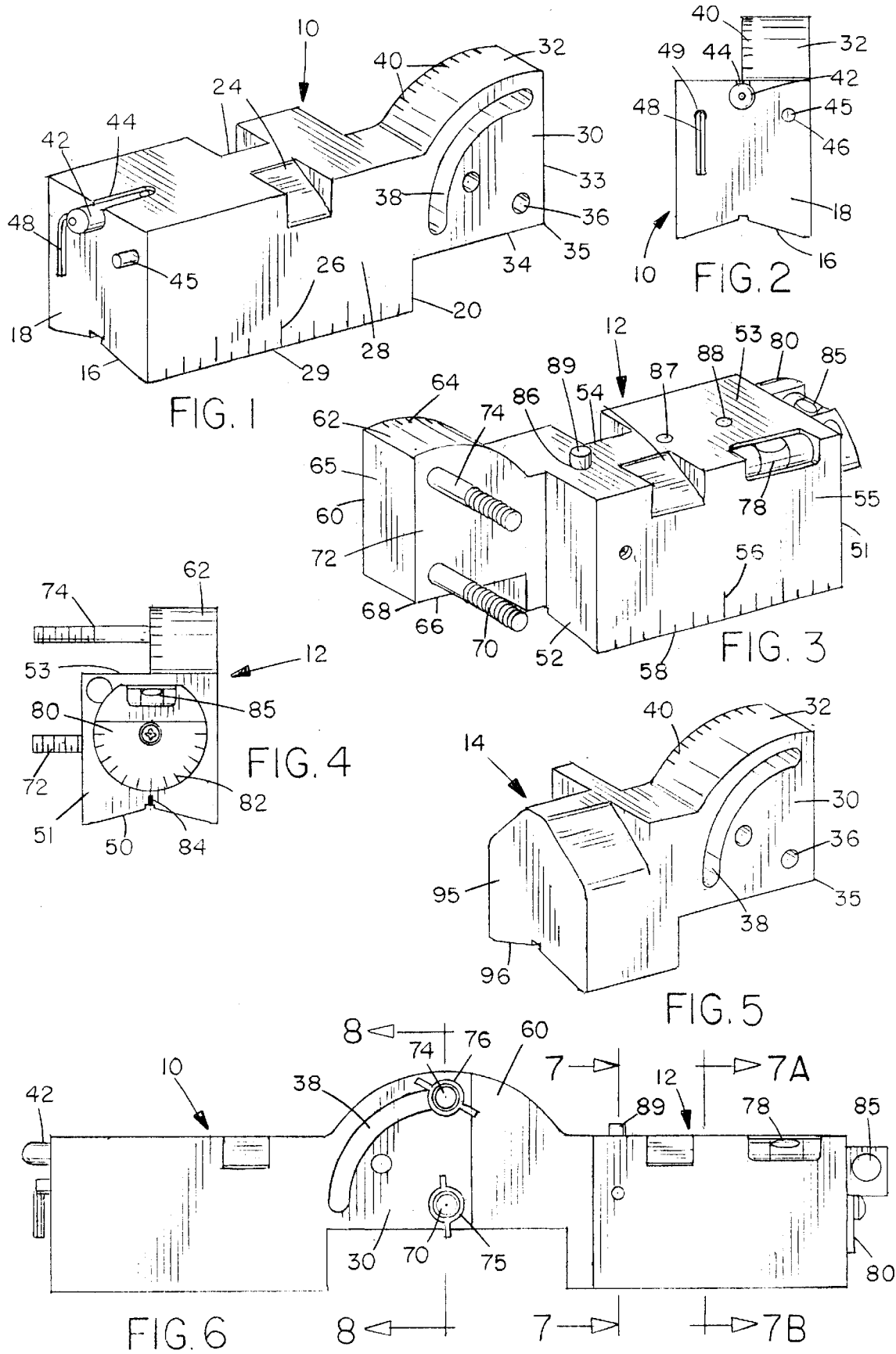

PIPE FITTING APPARATUS AND METHOD

BACKGROUND OF THE INVENTION

The present invention relates generally to pipe fitting, and is particularly concerned with an apparatus and method for performing various pipe fitting operations.

In pipe fitting operations, successive sections of pipe must be positioned, aligned, and welded together in the proper relative orientations. Piping systems are required in many areas, including water and sewage pipes, plumbing systems of all types, power plants, chemical plants, and many more. Pipe fitting operations typically involve use of various different tools, and often require more than one person to support and position the pipe sections during welding. The tools typically used by pipe fitters are leveling devices, such as plumb lines and bubble type levels; clamping devices for holding pipe sections, as well as other devices to be attached to the piping, such as valves and the like; measuring devices for measuring lengths and angles; and scribers for marking positions on pipes to show where a hanger will be positioned, or for positioning pipe ends at the appropriate spacing for welding.

When pipes are to be hung above the ground or suspended from a ceiling, it is necessary to provide hangers at spaced intervals for supporting the pipes. The hangers must be properly aligned to avoid stress on the pipes and to keep them in the desired orientation. Up to now, this has been done by means of a level hung on a line extending along the desired piping path. However, this may sag or bend in the wind, causing improper hanger positioning.

Currently, pipe fitting operations require a variety of different and separate tools which the pipe fitter may not have readily available. Additionally, some operations are difficult to perform using current tools, and may require more than one person.

SUMMARY OF THE INVENTION

It is an object of the present invention to provide a new and improved pipe fitting apparatus and method.

According to one aspect of the present invention, a pipe fitting apparatus is provided which comprises a first connector unit for releasable connection to a first pipe adjacent to a pipe end to be coupled, the first unit having a groove for location against the outside of the first pipe and a groove axis for extending parallel to the axis of the pipe; a second connector unit for releasable connection to a second pipe adjacent a pipe end to be coupled, the second connector unit having a groove for location against the outside of the second pipe and defining a groove axis for extending parallel to the pipe axis; and a pivot coupling for adjustably securing the first and second connector units together, the pivot coupling having a pivot axis extending transverse to the groove axis for pivotal adjustment of the orientation of the second connector unit relative to the first connector unit, whereby the relative orientation of the first and second pipes to be coupled can be adjusted; and a releasable locking device for releasably securing the second connector unit at a selected orientation relative to the first connector unit, the pivot coupling including an angular scale for indicating the angle of the second connector unit relative to the first connector unit.

In an exemplary embodiment of the invention, a level device, such as a bubble level, is secured to one of the connector units for determining when the connector unit is in a horizontal orientation, so that the orientation of both connector units can be accurately determined. An angle level may be secured to one end of the unit carrying the level device to permit angular positioning of the unit relative to the vertical. A laser pointing device may be mounted at one end of one of the units in an orientation parallel to the groove axis. This may be used for alignment of hangers at the appropriate heights for suspending successive pipe sections.

In the exemplary embodiment, the connector units are both generally elongate members, each having linear scale markings extending along their length for measuring distances along a pipe to which the connector unit is secured. One of the members may have one or more through bores extending through it in a direction transverse to the groove axis and pivot axis, and projecting through a central axis of the groove. A center punch may be mounted in one of the through bores for punching a hole in a pipe at a position at which a smaller branch pipe or valve is to be secured. This may be used in conjunction with the angle level for appropriate positioning prior to punching a hole in the pipe.

According to another aspect of the invention, a pipe fitting method is provided which comprises the steps of securing a first connector unit to a first pipe section adjacent the pipe end, adjustably securing the first connector unit to a second connector unit by means of a pivot coupling for rotational adjustment of the orientation of the second connector unit relative to the first connector unit about a pivot axis extending transverse to the secured pipe axis, securing the second connector unit to a second pipe section for connection to the first pipe section, releasably locking the second connector unit at a selected angular orientation relative to the first connector unit, welding the pipe sections together, and releasing the first and second connector units from the pipe sections.

With this invention, a single apparatus is provided which can be easily used by a single person to position two lengths of pipe relative to one another at any desired relative orientation and to hold the pipe sections together while welding the pipe sections directly to each other or to an intervening pipe coupling. The apparatus also incorporates various auxiliary devices for leveling, measuring, and alignment purposes, avoiding the need for the pipe fitter to have to carry, or have available, a large number of separate tools.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 1 is a perspective view of one unit of the pipe fitting tool according to an exemplary embodiment of the invention;

FIG. 2 is a left hand end view of the unit;

FIG. 3 is a perspective view of a second unit of th e tool;

FIG. 4 is a right hand end view of the unit of FIG. 3;

FIG. 5 is a perspective view of a third, shortened unit of the tool;

FIG. 6 is a side view of the first and second units connected;

DETAILED DESCRIPTION OF THE DRAWINGS

Figure 7:
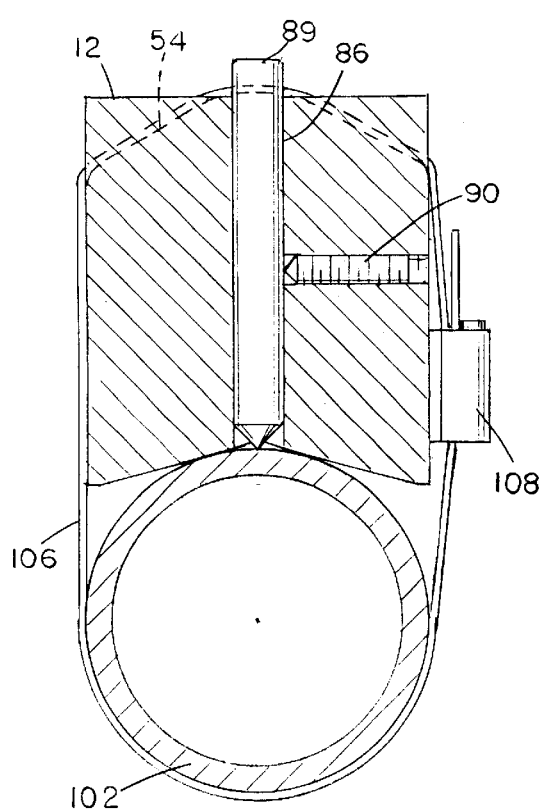
FIG. 7 is an enlarged sectional view taken on line 7—7 of FIG. 6.

FIGS. 1 to 8 of the drawings illustrate a pipe fitting apparatus according to an exemplary embodiment of the invention, while FIGS. 9 to 12 illustrate various arrangements of the apparatus for holding various pipe sections and pipe couplings for welding.

The apparatus basically comprises a first connector or clamp unit 10, as illustrated in FIGS. 1 and 2, and a second connector or clamp unit 12, as illustrated in FIGS. 3 and 4, for releasable pivotal connection to the first clamp unit 10 as indicated in FIG. 6. The first connector or clamp unit 10 is interchangeable with a third clamp unit 14 which is shorter in length and can be used for shorter pipe sections or where there is insufficient space for the longer clamp unit 10.

The three units 10,12 and 14 are each made of a rigid metal such as stainless steel. The first unit 10 is of generally rectangular or square cross-section along most of its length and has a generally V-shaped indent or groove 16 running along one of its faces from a first end face 18 to a second end face 20 of the rectangular shaped portion. The upper face 22 of unit 10 opposite to groove 16 has a pair of square cut-outs or indents 24 for seating a hose clamp or tie, as will be described in more detail below with reference to FIGS. 9 to 12.

Scale markings 26 in inches are provided along one side face 28 of the unit 10, along edge 29 which can then act as a measuring scale, while corresponding scale markings in centimeters (not illustrated) are provided along the opposite side face. A connecting portion 30 for pivotal connection to the second unit 12 projects from the end face 20 of unit 10. Connecting portion 30 is of generally square shape, with an arcuate upper face 32, a first flat face 33 projecting downwardly from the outer end of the upper face 32, and a lower flat face 34 extending at a right angle to face 33, forming a right angle corner 35. A pivot opening or through bore 36 is formed adjacent corner 35. An arcuate guide slot 38 extends across the portion 30 adjacent face 32 and at the same curvature as face 32, from a location adjacent the outer end face 33 to a location adjacent the inner end of face 34. An angular scale 40 is formed across the arcuate upper face 32.

Various tools are mounted in the end face 18 of unit 10. A laser pointer device 42 is removably mounted in a first bore 44 extending inwardly transverse to end face 18. A scriber 45 for marking pipes and the like is removably mounted in a second bore 46, and an Allen wrench 48 is removably mounted in a third bore 49.

The second unit 12 will now be described in more detail with reference to FIGS. 3 and 4. The unit 12 is also of generally square or rectangular cross section along most of its length, and also has a generally V-shaped indent or groove 50 extending along its lower face between end faces 51 and 52. The opposite or upper face 53 has a pair of opposing indents 54 identical to indents 24 in unit 10, also for retaining a hose tie or band. One side face 55 has linear scale markings 56 in inches extending along straight edge 58, while the opposite side face has similar markings in centimeters (not illustrated).

Figure 8:
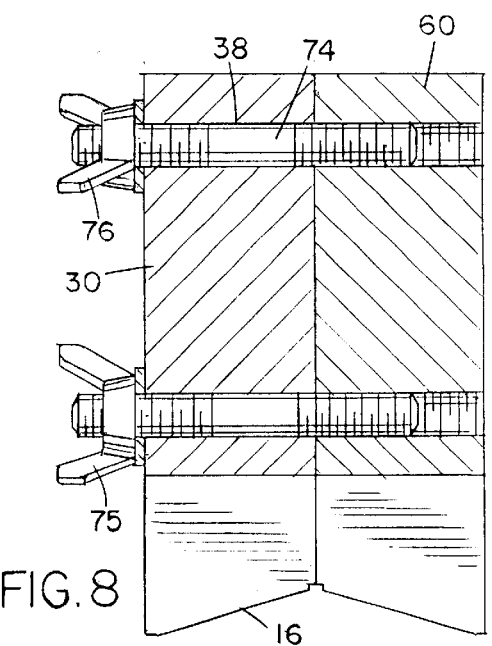
FIG. 8 is an enlarged sectional view taken on line 8—8 of FIG. 6.

A connector portion 60 of similar shape to connector portion 30 of the first unit projects from end face 52 for releasable pivotal connection to portion 30. Portion 60 has an arcuate upper face 62 with angular scale markings 64, and perpendicular end faces 65,66 defining a right angle corner 68. A first, pivot pin 70 projects from an inner side face 72 of portion 60 adjacent corner 68, for pivotal engagement in pivot opening 36 of unit 10. A second, angular adjustment guide pin 74 projects from side face 72 above pivot pin 70 for sliding engagement through the angular slot 38 in portion 30 of unit 10. When the units 10,12 are releasably secured together as in FIG. 6, the two pins are releasably retained in the pivot opening 36 and slot 38, respectively, via end nuts 75,76, respectively, as best illustrated in FIG. 8. Nuts 75 and 76 are tightened to lock the pin 74 at a selected position along slot 38, corresponding to a selected relative orientation of unit 10 to unit 12, and are loosened to allow the relative orientation of the units to be adjusted. The angular scale markings 40 and 64 will indicate the angle of unit 12 relative to unit 10.

In the configuration of FIG. 6, the unit 12 is aligned in a straight line with unit 10, i.e. at an angle of 180 degrees, and the two grooves 16 and 50 will also be aligned. In this configuration, pin 74 is at the outer end of slot 38. By loosening nuts 75 and 76 and rotating or pivoting unit 12 in an anti-clockwise direction about the axis of pin 70, pin 74 will move towards the opposite end of slot 38. When it reaches the opposite end of the slot, the two units will be at a right angle, or 90 degrees, to each other, as indicated in FIG. 11, for example. However, the pin 74 may be positioned at any desired location along slot 38 defining a range of angles for unit 12 relative to unit 10, such as the obtuse angle illustrated in FIG. 10 when the pin 74 is located approximately halfway along slot 38 and the units are at an angle of around 125 degrees.

Unit 12 also incorporates a bubble level 78 on one side edge of upper face 53, for measuring when the unit is horizontally oriented, and thus also measuring when an attached unit 10 in the configuration of FIG. 6 is horizontal. A circular plate 80 or angle level device is rotatably mounted on the outer end face 51 of the unit 12. Plate 80 has angular scale markings 82 around at least part of its periphery, which can be aligned with mark 84 on the end face to indicate the angle of plate 80. A bubble level 85 is mounted on plate 80 such that it will indicate a horizontal orientation when the zero on scale 82 is aligned with mark 84 and the unit is horizontal.

Figure 7A:
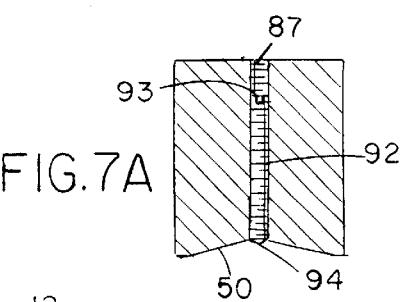

The second unit 12 also has a series of three through bores 86,87, and 88 at one inch spacings which extend transversely from the upper face 53 through the center line of groove 50, as best illustrated in FIGS. 3, 7 and 7A. A center punch 89 is slidably mounted in the first through bore 86, and is releasably retained in the bore 86 by a retaining screw 90, as best illustrated in FIG. 7. A scriber 92 is threadably engaged in each of the other two through bores 87,88, as best illustrated in FIG. 7A. Each scriber has a hex indent 93 at its upper end for engagement by the Allen wrench in order to extend or retract the pointed end 94 of the scriber out of the bore to project into the groove 50.

The third unit 14 has a connecting portion 30 identical to that of the first unit 10, and like reference numerals have been used for like parts as appropriate. However, the remainder or body 95 of unit 14 is much shorter than the body of unit 10. In one example, the body had a length of about ⅓ that of unit 10. Similar to unit 10, unit 14 has a generally V-shaped indent or groove 96 in the lower face of the body. It is securable to the second unit 12 at any selected angle, in exactly the same way as unit 10, as illustrated, for example, at two places in FIG. 12. Various combinations of units 10 and 12 and units 10 and 14 may be used to hold pipe sections together during welding to form various different types of pipe junctions, as will be described in more detail below.

Figure 9:
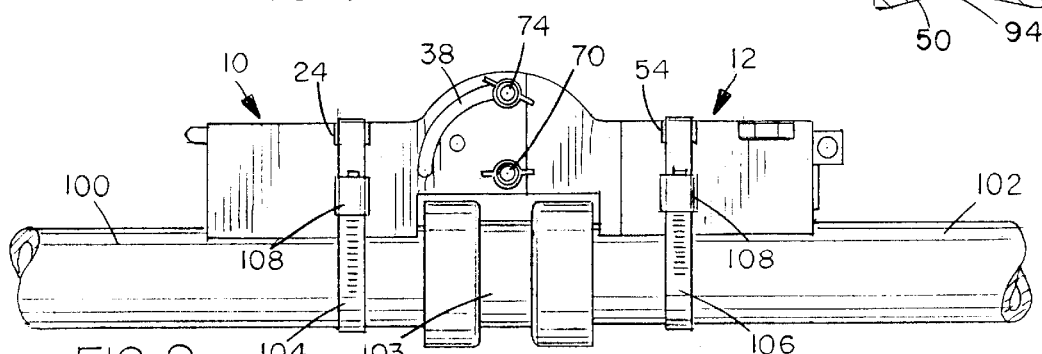
FIG. 9 is a side view of the tool shown in FIG. 6, holding two sections of pipe and a coupling in a straight line configuration.

Connection of a first pipe section 100 to a second pipe section 102 aligned with the first section will first be described, with reference to FIG. 9. Units 10 and 12 are first secured together in alignment, with pin 74 at the outer end of slot 38, as in FIG. 6. The first unit 10 is then secured to the first pipe section 100 by placing the groove 16 against the outside of the pipe, and securing the unit to the pipe with a pipe or hose tie 104 extending around the pipe and unit 10, as in FIG. 9, with the tie 104 located in indents 24. A pipe coupling 103 is placed between the pipe ends in a conventional manner, and the second unit 12 is then secured to the second pipe section 102 in a similar manner, with a pipe tie 106 extending around pipe 102 and unit 12, and tightened into indents 54, as illustrated in FIGS. 7 and 9. Pipe ties 104,106 are conventional metal strap ties secured in place by slide-through fasteners or clasps 108. The pipe ends are now securely held in position for welding together via coupling 103.

Figure 10:
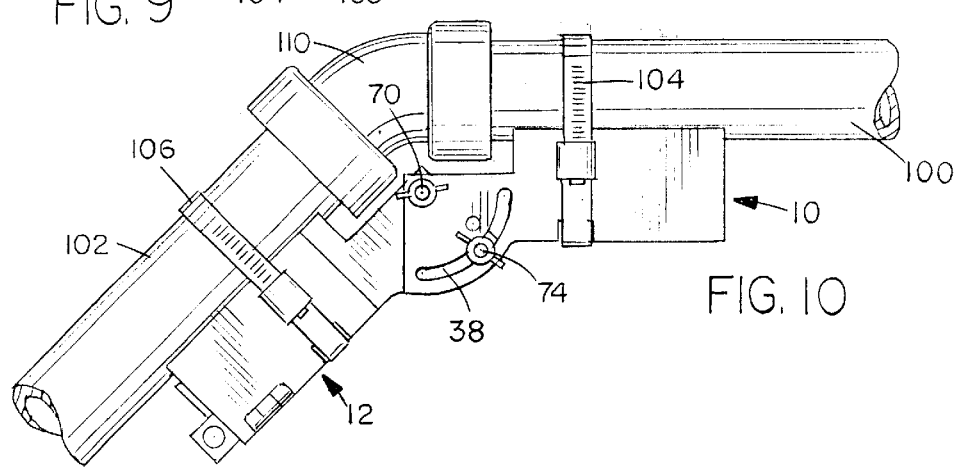
FIG. 10 is a side view showing the tool holding pipes and a coupling in an angular configuration.
Figure 11:
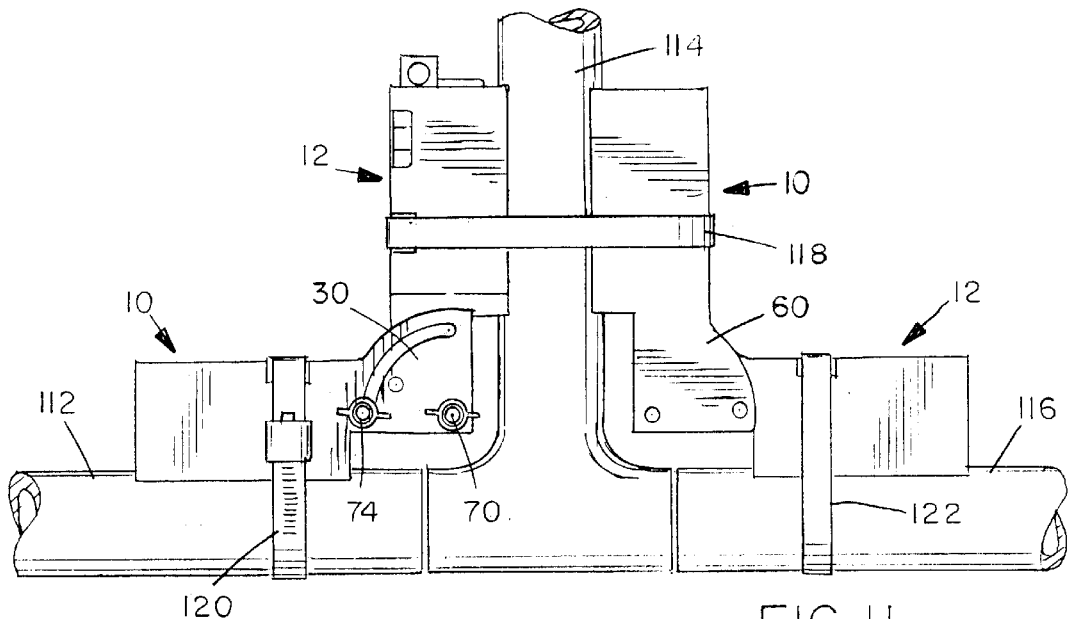
FIG. 11 shows two tool assemblies holding a Tee joint.

FIG. 10 illustrates a similar arrangement, but with the second pipe section 102 at an angle to the first pipe section 100. Rather than judging the correct angle by eye, as was common practice in pipe fitting up to now, the angle of the second pipe section 102 can be accurately determined by positioning the second unit 12 at a selected angle relative to first unit 10, using the angle scale markings on the two units. The two pipe sections are then properly positioned for welding together with angled coupling 110.

FIG. 11 illustrates positioning of two sets of units 10,12 for forming a T-junction in a piping system. Each pair of units is positioned with unit 12 at a right angle to unit 10. The left hand pair of units as viewed in FIG. 11 is then positioned with first unit 10 secured to one pipe section 112, and second unit 12 located against the upright pipe 114 of the T-junction. The right hand pair of units is positioned with unit 12 against the pipe section 116 aligned with pipe section 112, and the first unit 10 against upright pipe 114. A single hose or pipe tie 118 is extended around both units 12 and 10 and the upright pipe 114. Unit 10 of the first pair is secured to pipe section 112 by a second hose tie 120, while unit 12 of the second pair is secured to pipe section 116 by a third hose tie 122. The two pipe sections 112 and 116 are then securely positioned next to the opposite branches of the T-junction for welding.

Figure 12:
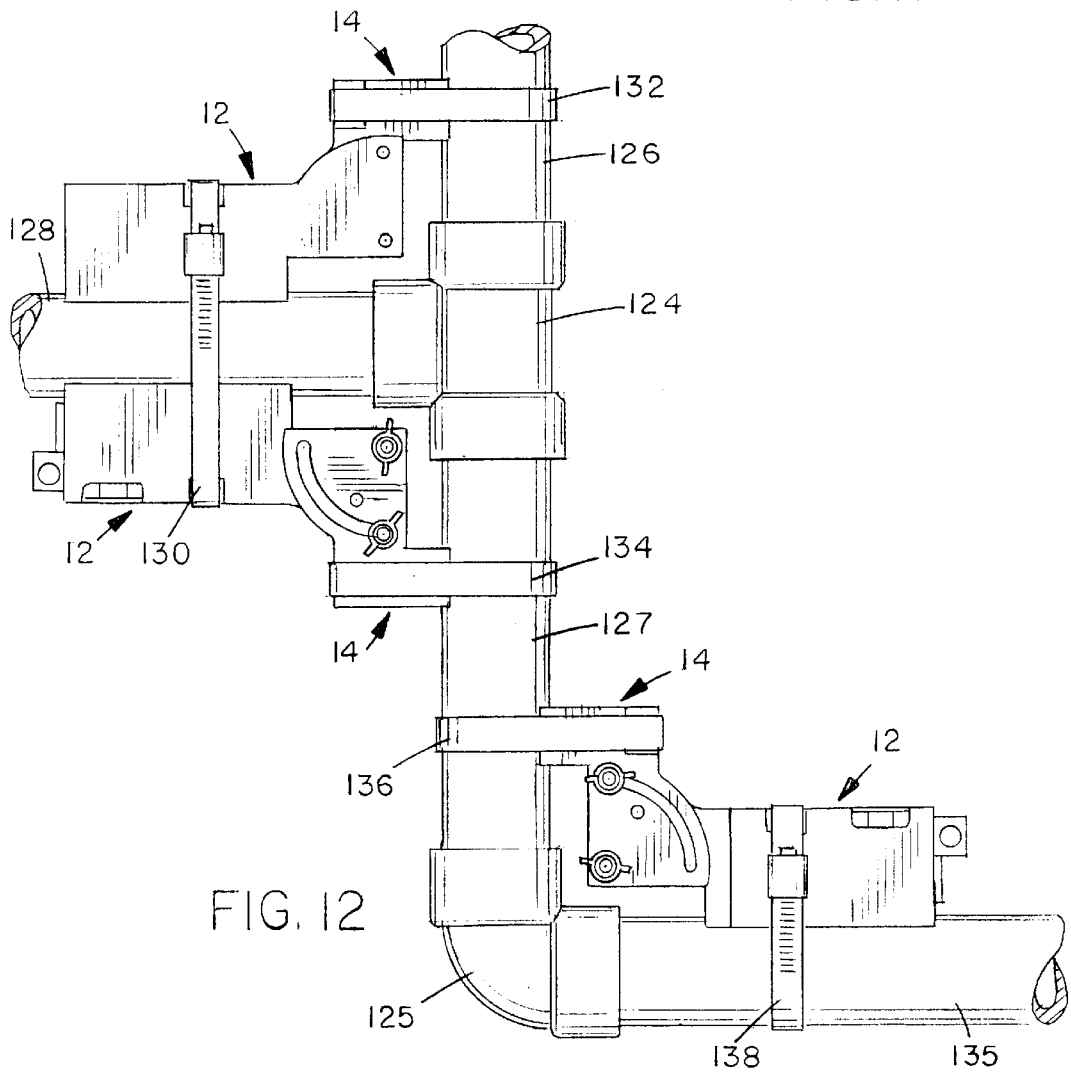
FIG. 12 illustrates various combinations of the tool units.

In FIG. 12, an arrangement is illustrated in which the longer first unit 10 is replaced by the shorter units 14 due to limited space. This drawing illustrates a T-junction 124 followed by a right angle bend 125 in a piping system. First and second pipe sections 126,127 are secured to opposite sides of T-joint or coupling 124 and third pipe section 128 is secured to the leg of the T-joint by two pairs of units 12,14, in a similar manner to the arrangement of FIG. 11. However, in this case, each unit 12 is placed opposite the other unit 12 and the pipe section 128 is gripped between them by a pipe tie 130 extending around both units 12 and the pipe section 128. The shorter units 14 are each positioned perpendicular to the respective unit 12 and secured to the two pipe sections 126,127 by pipe ties 132,134, respectively. The pipe sections are then securely held against the T-junction in the appropriate position for welding.

The pipe section 127 is also secured to a fourth pipe section 135 at a right angle via the perpendicular bend coupling 125. Again, a combination of a second unit 12 and a shorter, third unit 14 is used to hold the two pipe sections 127,135 as they are welded. The units are secured together at a right angle, by rotating the unit 12 about the pivot axis defined by pin 70 until the guide pin 74 reaches the appropriate end of the slot 38 in unit 14, and then locking the pins in position using lock nuts 75 and 76. Unit 14 is then secured to pipe section 127, where there is only limited room, using pipe tie 136, while unit 12 is secured to the fourth pipe section 135 by pipe tie 138. This will hold the two pipe sections 127 and 136 perpendicular to one another while they are welded to opposite ends of angled pipe coupling 125.

In addition to holding pipe sections relative to one another at any desired angle while a junction is welded, the apparatus of this invention can also be used for performing many other tasks associated with pipe fitting. The bubble levels 78 and 85 can be used to determine proper pipe orientation. The laser pointer 42 can be used for proper alignment of pipe hangers in a suspended piping system relative to a previously hung, horizontal pipe section on which the units 10 and 12 are secured. Thus, with the units 10,12 secured as in FIG. 9, laser pointer 42 will shine a horizontal beam of light for mounting pipe hangers down line from pipe section 100. This will allow much more accurate alignment of pipe hangers than the previous technique where a leveling device was hung on a line, and is much easier and more convenient to use.

The scale markings along both edges 29 and 58 allow measurements to be made along a pipe, and the scriber 45 may then be used to mark positions for hangers or the like. The center punch 89 and scribers 92 can be used in conjunction to mark positions one inch or two inches from the end of a pipe, for example for indicating how far the pipe should be inserted into a pipe coupling. The center punch 89 is first extended out into the groove 50, to project beyond the position illustrated in FIG. 7. A pipe is then held in the groove 50 with its end face against the center punch 89. At this point, the first scriber 92 in bore 87 will be one inch from the end of the pipe, and the second scriber in bore 88 will be two inches from the end of the pipe. The Allen wrench 48 may then be inserted in the end of one of the scribers 92 and rotated to extend the pointed end of the scriber out to mark the pipe. This provides a convenient way of marking positions measured from the end of a pipe, without needing two or three separate tools such as a tape measure or ruler, scriber, and pipe clamp.

The center punch 89 may also be used to punch holes at desired positions in a pipe for connection to smaller pipes, valves, or the like. The punch 89 may be used in conjunction with angle level 80,85 to first mark a position at which an auxiliary device is to be mounted, and then to punch a hole in a main pipe at a desired orientation relative to the vertical to ensure that the connected pipe or valve will extend at the desired angle.

The pipe fitting tool of this invention is therefore extremely versatile, easy to use, and can replace a large number of different, separate tools which previously had to be either carried or kept in an accessible location for pipe fitters. The pipe fitter now needs only combinations of three basic units to make a wide variety of different pipe junctions at different angles, and can readily measure and align the pipe sections in any desired orientation. The tool also has a built-in laser pointer for alignment of hangers and the like, and a center punch and angle level combination for punching holes at appropriate orientations on a larger pipe for connection to smaller pipes, valves, and the like. This will make pipe fitting operations in the field much easier, and provide for much more accurate positioning of pipes while welding than the previous manual techniques.

Although an exemplary embodiment of the invention has been described above by way of example only, it will be understood by those skilled in the field that modifications may be made to the disclosed embodiment without departing from the scope of the invention, which is defined by the appended claims.

I claim:

1. A pipe fitting apparatus, comprising:
   a first connector unit for releasable connection to a first pipe adjacent a pipe end to be coupled, the first connector unit having a groove for location against an outside surface of the first pipe and having a groove axis for extending parallel to the axis of the pipe;
   a second connector unit for releasable connection to a second pipe adjacent a pipe end to be coupled, the second connector unit having a groove for location against an outside surface of the second pipe and defining a groove axis for extending parallel to the pipe axis;
   a pivot coupling for adjustably securing the first and second connector units together, the pivot coupling having a pivot axis extending transverse to the groove axis for pivotal adjustment of an angle of the second connector unit relative to the first connector unit, and a releasable locking device for releasably securing the second connector unit at a selected orientation relative to the first connector unit; and
   a level device secured to one of the connector units for determining when the connector unit is in a horizontal orientation.

2. The apparatus as claimed in claim 1, wherein the pivot coupling includes an angular scale for indicating the angle of the second connector unit relative to the first connector unit.

3. The apparatus as claimed in claim 1, including a first tie device for securing a first pipe to the first connector unit and a second tie device for securing a second pipe to the second connector unit.

4. The apparatus as claimed in claim 1, including an angle level secured to one end of the connector unit carrying the level device for angular positioning of the connector unit.

5. The apparatus as claimed in claim 1, wherein the connector units are both generally elongate members, the connector units each having linear scale markings extending along its length for measuring distances along a pipe to which the connector unit is secured.

6. The apparatus as claimed in claim 5, wherein the connector units each have opposite first and second ends and a pivotal connector portion projecting from the second end for releasable pivotal connection to the pivotal connector portion of the other connector unit, one of the connector portions having an arcuate slot forming part of a circle having a center on the connector portion and a pivot hole extending through the center, and the other connector portion having a first, pivot pin projecting in a direction transverse to the groove axis for pivotal engagement in the pivot hole, and a second pin spaced from the first pin and extending parallel to the first pin for engagement in said arcuate slot, the second pin moving along said slot as said second connector unit is rotated relative to said first connector unit, said pivot coupling comprising said pivotal connector portions and pins.

7. The apparatus as claimed in claim 6, wherein the pivotal connector portion having said arcuate slot includes angular scale markings extending along at least part of said slot for indicating the angle of said second connector unit relative to said first connector unit based on the position of said second pin in said slot.

8. The apparatus as claimed in claim 5, wherein each of said connector units is of generally rectangular cross-section having an upper generally flat face, a lower face, and opposite side faces, the grooves each being formed along the lower face of the respective connector unit, and the upper face of the connector units each having opposing seating indents for seating a pipe tie extending around the connector unit and a pipe against which the groove is seated.

9. The apparatus as claimed in claim 5, including a third connector unit for selective pivotal connection to the second connector unit in place of the first connector unit, the first connector unit being of predetermined length and the third connector unit having a length less than that of the first connector unit.

10. A pipe fitting apparatus, comprising:
    a first connector unit for releasable connection to a first pipe adjacent a pipe end to be coupled, the first connector unit having a groove for location against an outside surface of the first pipe and having a groove axis for extending parallel to the axis of the pipe;
    a second connector unit for releasable connection to a second pipe adjacent a pipe end to be coupled, the second connector unit having a groove for location against an outside surface of the second pipe and defining a groove axis for extending parallel to the pipe axis;
    a pivot coupling for adjustably securing the first and second connector units together, the pivot coupling having a pivot axis extending transverse to the groove axis for pivotal adjustment of an angle of the second connector unit relative to the first connector unit, and a releasable locking device for releasably securing the second connector unit at a selected orientation relative to the first connector unit; and
    a laser pointing device mounted at one end of one of the connector units in an orientation parallel to the groove axis.

11. A pipe fitting apparatus, comprising:
    a first connector unit for releasable connection to a first pipe adjacent a pipe end to be coupled, the first connector unit having a groove for location against an outside surface of the first pipe and having a groove axis for extending parallel to the axis of the pipe;
    a second connector unit for releasable connection to a second pipe adjacent a pipe end to be coupled, the second connector unit having a groove for location against an outside surface of the second pipe and defining a groove axis for extending parallel to the pipe axis;
    a pivot coupling for adjustably securing the first and second connector units together, the pivot coupling having a pivot axis extending transverse to the groove axis for pivotal adjustment of an angle of the second connector unit relative to the first connector unit, and a releasable locking device for releasably securing the second connector unit at a selected orientation relative to the first connector unit; and
    the connector units are both generally elongate members, the connector units each having linear scale markings extending along its length for measuring distances along a pipe to which the connector unit is secured; and
    one of the connector units has at least one through bore extending through it in a direction transverse to the groove axis and terminating at the groove axis.

12. The apparatus as claimed in claim 11, where in a tool having a sharp end for marking a pipe is mounted in the through bore.

13. A pipe fitting apparatus, comprising:
a first connector unit for releasable connection to a first pipe adjacent a pipe end to be coupled;
a second connector unit for releasable connection to a second pipe adjacent a pipe end to be coupled to the first pipe end;
the connector units each having opposite first and second ends and a groove on one face for location against an outside surface of a pipe, the groove defining a longitudinal groove axis extending parallel to the axis of a pipe to which it is secured;
the second end of each connector unit having a pivotal coupling formation for pivotal connection to a corresponding pivotal coupling formation on the other connector unit;
the second end of the first connector unit having a through bore extending transverse to the groove axis, the through bore comprising one of said pivotal coupling formations;
the pivotal coupling formation on the second connector unit comprising a pivot pin extending from said second end for releasable pivot engagement through said bore; and
a releasable locking device for releasably securing the second connector unit with the longitudinal groove axis of the second connector unit extending at a selected angle relative to the longitudinal groove axis of the first connector unit, whereby the connector units can be secured to pipes at any selected relative orientation to hold the pipes at the selected relative orientation as they are coupled together.

14. The apparatus as claimed in claim 13, wherein the first connector unit has an arcuate guide slot adjacent said second end centered on said through bore, and said second connector unit has a second pin extending parallel to said pivot pin for sliding engagement in said slot, and a second releasable locking device for releasably securing said pin at a selected position in said slot.

15. The apparatus as claimed in claim 14, including angular scale markings extending along said slot for indicating an angle of said second connector unit relative to said first-connector unit.

16. The apparatus as claimed in claim 13, wherein a plurality of accessory tools are mounted in each connector unit.

17. The apparatus as claimed in claim 16, wherein one of said accessory tools comprises a laser pointer device mounted at the first end of one of the connector units.

18. The apparatus as claimed in claim 16, wherein said accessory tools include at least one scriber for marking positions on a pipe.

19. The apparatus as claimed in claim 16, wherein said accessory tools include a level measuring device and an angular level device.

20. The apparatus as claimed in claim 13, wherein each connector unit has opposite flat side faces along opposite sides of said groove, and linear scale markings extending along one side face adjacent the groove side for measuring distance along a pipe secured against said groove.

* * * * *